United States Patent [19]
Khatti

[11] 3,945,475
[45] Mar. 23, 1976

[54] PRESSURIZED DIFFERENTIAL VALVE

[75] Inventor: Ramkishan Khatti, Racine, Wis.

[73] Assignee: Allis-Chalmers Corporation, Milwaukee, Wis.

[22] Filed: Dec. 23, 1974

[21] Appl. No.: 536,033

[52] U.S. Cl.............. 192/4 A; 74/710.5; 137/625.6
[51] Int. Cl.² ...................... F16H 1/44; B60K 29/02
[58] Field of Search..................... 192/4 A; 74/710.5

[56] References Cited
UNITED STATES PATENTS

| | | | |
|---|---|---|---|
| 3,446,320 | 5/1969 | Schott | 192/4 A |
| 3,467,212 | 9/1969 | Doll | 74/710.5 X |
| 3,642,103 | 2/1972 | Schott | 192/4 A |

Primary Examiner—Benjamin W. Wyche
Attorney, Agent, or Firm—Arthur L. Nelson

[57] ABSTRACT

A pressure biased control valve biased to a position for communication between a source of pressurized fluid and a differential locking clutch of the differential and a relay valve selectively positioned to interrupt communication between said control valve and differential lock clutch responsive to actuation of the vehicle brakes.

10 Claims, 2 Drawing Figures

PRESSURIZED DIFFERENTIAL VALVE

This invention relates to a hydraulic valve and more particularly to a pressure biased control valve biased to a position for communication between a source of pressurized fluid and a differential lock clutch on the differential. Communication is also provided to a control chamber from the source of pressurized fluid to bias the control valve to the position for communication between the source of pressurized fluid and the differential lock clutch. A relay valve for interrupting communication between the control valve and the differential clutch interrupts communication between the source of pressurized fluid and the control chamber and connects the control chamber to sump and allows the control valve to shift to a closed position and release pressure in the differential clutch in response to actuation of the vehicle brakes.

Conventionally, vehicles are provided with a drive line which includes a differential to permit one of the drive wheels to rotate at a faster rate than the other. While the differential action between the drive wheels is necessary for steering, there are times when it is desirable to rotate both wheels synchronously. When one wheel loses traction, the driving force may then be transferred to the other wheel which retains the tractor effort. This may be accomplished in various means such as an overrunning clutch on the rear drive wheels which will immediately engage when one wheel slips. These devices are generally mechanical and are automatic in response to the condition of the terrain on which the vehicle is operating.

There are other mechanical means for driving the drive wheels synchronously which can be manually operated by the operator of the vehicle. While these may be satisfactory, it is desirable that some atuomatic means be provided whereby if the vehicle is braked, that the synchronous rotating means for the drive wheels be released. This is usually done to avoid scuffing of the tires and possibly the loss of control of the vehicle when it is being steered.

Although mechanical arrangements for the automatic release of the differential lock have been used, they are not as responsive to controls as a hydraulic means. Accordingly, this invention provides for a hydraulically actuated differential locking clutch in the differential. The engaging of the hydraulic clutch may be manually controlled to selectively engage or disengage the clutch. Once the clutch is engaged, it is retained in engagement by hydraulic pressure in a control chamber operating on the control valve. When the vehicle brakes are released, a relay valve is operated which automatically interrupts the flow of pressurized fluid to the control chamber of the control valve. This permits the control valve to interrupt the flow of pressurized fluid to the differential locking clutch and releases the pressure to thereby unlock the differential clutch. Accordingly, the differential lock is automatically released in response to actuation of either one of the drive wheel brakes and also both the brakes.

It is an object of this invention to provide a pressure biased control valve for operating a differential clutch and controlling the flow of pressurized fluid to maintain the control valve in the clutch operating position responsive to pressure in the clutch operating fluid circuit.

It is another object of this invention to provide a relay valve for closing a pressure biased control valve by connecting a control chamber in the control valve to sump and allowing resilient means to bias the control valve to a closed position and interrupt operation of the differential clutch.

It is a further object of this invention to provide a pressure biased control valve to normally provide communication between the source of pressurized fluid and a differential clutch for locking of the differential clutch and having a relay valve operating responsive to fluid pressure in a hydraulic fluid brake system to interrupt flow of pressurized fluid from the control valve to the control chamber in the control valve to bias the control valve to a closed position and release the pressure in the differential clutch and cause the clutch to disengage.

The objects of this invention are accomplished by providing a control valve which selectively supplies pressurized fluid from a source of pressurized fluid to operate a differential clutch for locking the differential. Communication is also provided between the source of pressurized fluid and a control chamber receiving pressurized fluid to normally bias the control valve to an open position for engaging the differential clutch. A relay valve having an actuating chamber in communication with the hydraulic fluid brake system operates a plunger to selectively interrupt communication between the control valve and the control chamber and vent the control chamber to sump. This permits resilient means to bias the control valve to a closed position and interrupt communication between the source of pressurized fluid and the differential clutch and vent the differential clutch actuator to sump. The operation of the system is automatic in response to operation of the vehicle brakes.

The preferred embodiments of this invention is illustrated in he attached drawings.

Figure 1:
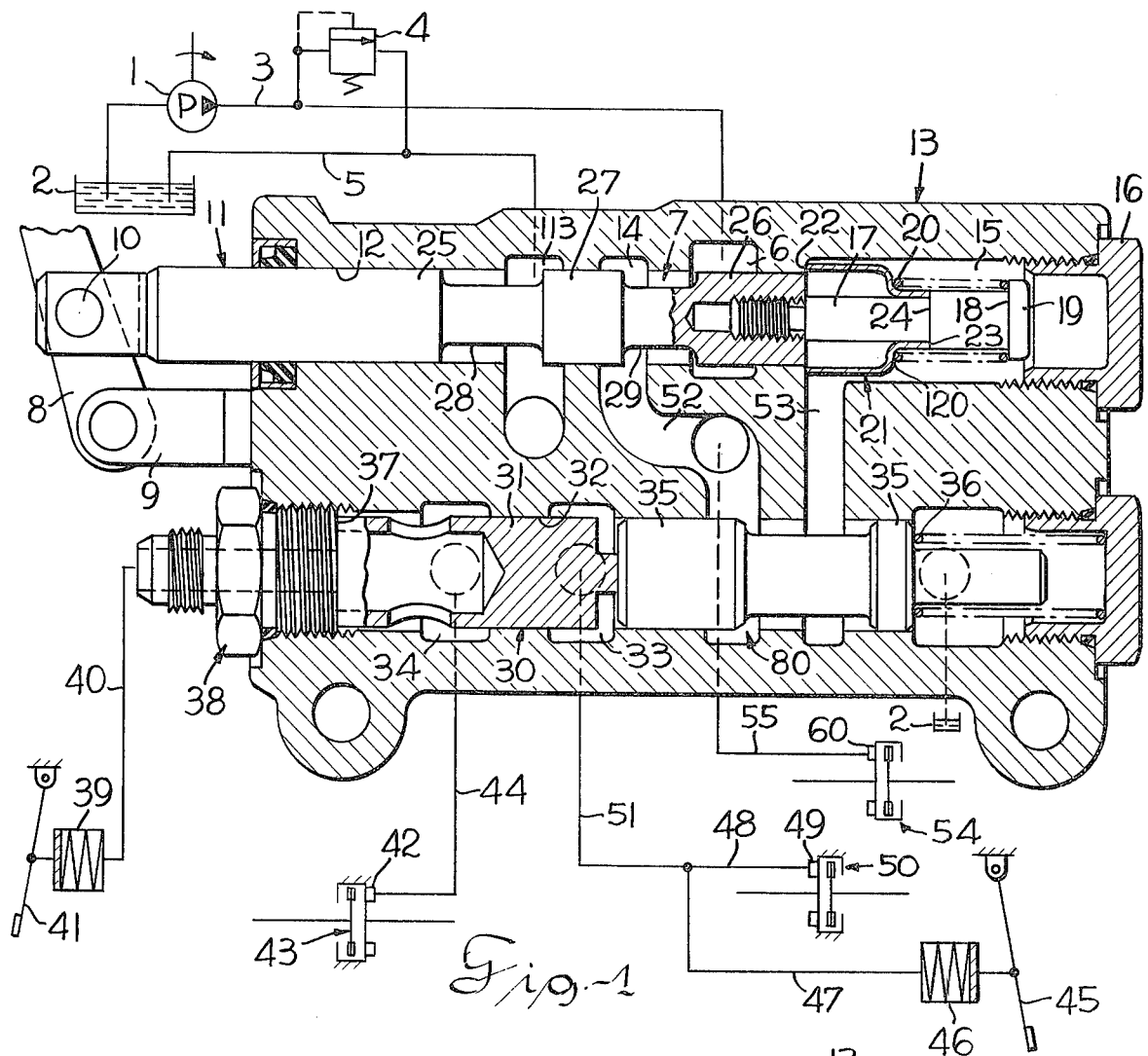
FIG. 1 is a schematic illustration of a hydraulic system and a cross section view of the control valve and relay valve positioned for operating the differential clutch.

Referring to the drawings, FIG. 1 schematically illustrates a hydraulic system and a cross section view of the hydraulic valve means. A hydraulic pump 1 receives hydraulic fluid from the sump 2 and pressurizes fluid in the conduit 3. The relief valve 4 operates to return hydraulic fluid at an excess pressure through the return conduit 5. Hydraulic fluid is supplied to the pump pressure chamber 6. A control valve 7 is manually operated by the manual control lever 8 which is pivotally mounted on the bracket 9 and pivotally connected by the pin 10 to the spool 11. The spool 11 extends through the cylindrical opening 12 in the valve housing 13. The cylindrical opening 12 extends through the sump chamber 113, the high pressure chamber 14 and the pump pressure chamber 6 which are axially spaced along the cylindrical opening 12. The control chamber 15 is positioned at the end of the cylindrical opening 12. The control chamber 15 is formed by the housing and the plug 16 which threadedly engages a threaded portion at the end of the chamber 15. The spool 11 is threadedly connected to the bolt 17 which forms a spring seat 18 by its head 19 which engages the spring 20. The spring 20 is compressively positioned between the spring seat 18 and the shoulder 120 on the sleeve 21. The sleeve 21 engages the radial flange 22 on the housing 13. The radial facing 23 on the end of the sleeve 21 provides a stop for the bolt 19 and spool 11 in the left hand direction as the shoulder 24 of bolt 17 engages the facing 23.

The spool 11 is formed with lands 25 and 26 on its ends and a center land 27 which forms the grooves 28 and 29. The grooves 28 and 29 control the flow of fluid between the pump 1 and the differential clutch 54 and between the differential clutch and the sump chamber 113. The spool is selectively positioned for the desired fluid flow through the control valve.

A relay valve 30 controls the flow of pressurized fluid from the control valve 7 to the control chamber 15. The relay valve consists of the hydraulic actuator including the piston 31 reciprocably mounted in the bore 32. The bore 32 extends through the actuating chamber 3 and the actuating chamber 34. The piston 31 is normally positioned to the left hand position by the plunger 35 engaging the spring 36. The piston 31 seats on the end 37 of the fitting 38. The fitting 38 is in communication with with the hydraulic brake cylinder 39 through conduit 40. The left hand wheel brake lever 41 operates the hydraulic brake cylinder 39. The hydraulic wheel cylinder 42 is pressurized to engage the left hand wheel brake 43 through conduit 44 in communication with the hydraulic actuating chamber 34. When the left hand wheel cylinder is pressurized, pressurized fluid in the conduit 44 and chamber 34 moves the piston 31 and plunger 35 in the right hand direction which in turn operates the relay valve 30.

The right hand wheel brake lever 45 operates the master cylinder 46 to pressurize fluid in the conduit 47. Pressurized fluid in conduits 47 and 48 pressurizes fluid in the wheel cylinder 49 of the right hand wheel brake 50. The conduit 51 is in communication with conduits 47 and 48 and hydraulic actuating chamber 33. When the right hand wheel cylinder is pressurized, pressurized fluid in conduit 51 and chamber 33 moves the plunger 35 in the right hand direction as relay valve 30 is operated.

FIG. 1 illustrates the pump pressure chamber 6 in communication through the cylindrical opening 12 and passage 52 through the bore 32 and passage 53 to the control chamber 15. The pressurized fluid in the control chamber 15 biases the spool 11 to the left hand position permitting the flow of pressurized fluid to the chamber 15 and to the differential clutch 54 through conduit 55.

Figure 2:
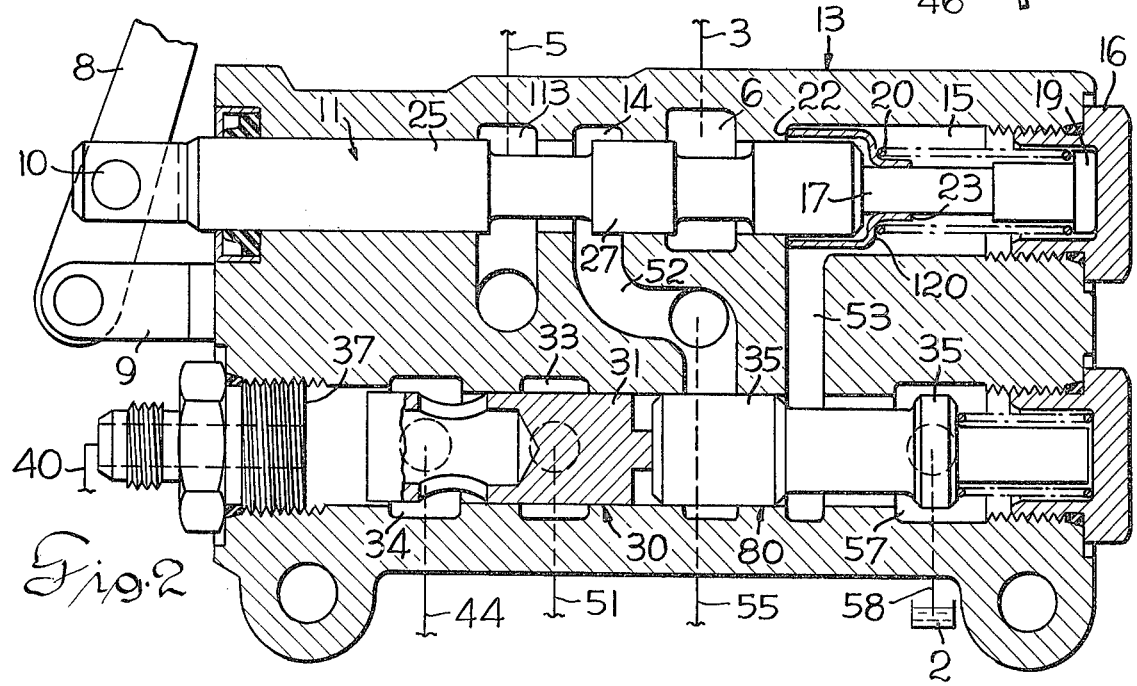
FIG. 2 is a cross section view of the control valve and relay valve positioned for release of the differential clutch while the braking system is in operation.

FIG. 2 illustrates the left hand wheel brake actuated with pressurized fluid biasing the piston 31 in the right hand direction and forcing the plunger 35 in the right hand direction providing communication between the control chamber 15 and the sump chamber 57. The sump chamber 57 is in communication through conduit 58 to the sump 2. The sump chamber 113 is also in communication through conduit 5 to sump 2. As the spool 11 is biased in the right hand position as shown in FIG. 2, the hydraulic actuator 60 of the differential clutch 54 is connected to sump.

The operation of the device will be described in the following paragraphs.

The pump 1 receives fluid from the reservoir 2 and pressurizes fluid in the conduit 3. The conduit 3 supplies pressurized fluid to the pump pressure chamber 6. When the control lever 8 is rotated in the counterclockwise direction the spool is biased in the left hand direction to a position as shown in FIG. 1. In this position, the pressurized fluid in the pump pressure chamber 6 passes through the passage formed by recess 29 of the spool 11 into the high pressure chamber 14. The pressurized fluid is free to flow through the passage 52 and conduit 55 to the hydraulic actuator 60 of the differential clutch 54. With the clutch 54 engaged, the differential is locked. The pressurized fluid is also available to control chamber 15 through the chamber 80 and passage 53 which retains the control spool 11 in clutch 54 engaged position.

The left hand hydraulic brake cylinder 39 is connected through the conduit 40 to the chamber 34. When the left hand wheel brake is actuated, the piston 31 operates the relay valve 30. When fluid is pressurized in the cylinder 39, the pressurized fluid flows through the conduit 40 and into the actuating chamber 34 to bias the piston 31 in the right hand direction. The piston 31 engages the plunger 35 and biases the plunger to the right hand position shown in FIG. 2. When the plunger 35 is biased to the right hand position as shown, the passage 52 and 53 between the high pressure chamber 14 and the control chamber 15 is interrupted. The control chamber 15 is connected to the sump chamber 57. When the control chamber 15 is reduced to the sump pressure, the spool is no longer biased to the left hand position by hydraulic fluid pressure and the spring 20 biases the spool 11 to the position as shown in FIG. 2. In this position, the flow of pressurized fluid from the pump pressure chamber 6 to the high pressure chamber 14 is interrupted. Accordingly, this reduces the pressure in the hydraulic actuator 60 of the differential clutch 54. Also, the movement of the spool 11 in the right hand direction places communication between the sump chamber 113 and the passage 52 and the hydraulic actuator 60 of the differential clutch. Accordingly, when the pressure in the hydraulic actuator of the differential clutch is reduced to sump pressure, the clutch is disengaged and the differential is free to operate for differential operation of the drive wheels.

When the hydraulic control valve and relay valve are positioned as shown in FIG. 1 and the right hand wheel brake is actuated, pressurized fluid from the cylinder 46 flows through the conduit 47, 51 to the actuating chamber 33. Pressurized fluid in the actuating chamber 33 biases the plunger 35 in the right hand direction to the position as shown in FIG. 2 while piston 31 remains in the position as shown in FIG. 1. The result of this operation is the same as for the left hand wheel brake, only that the piston 31 remains in its original position. Interruption of communication between the high pressure chamber 14 to the control chamber 15 is the same because sump pressure is applied to the control chamber. This allows the spool 11 to move to the right hand direction as shown in FIG. 2 and the hydraulic actuator 60 is also reduced to sump pressure and the differential clutch of the differential is released.

Actuation of both the brakes simultaneously would provide the same result as described above, enabling release of the differential clutch as shown in FIG. 2.

The embodiments of the invention in which an exclusive property or privilege is claimed are defined as follows:

1. A hydraulic valve means for controlling a differential clutch comprising a control valve including a valve element adapted for selectively connecting and disconnecting a source of pressurized fluid to a differential clutch, means defining a sump chamber in said hydraulic valve means adapted for connection to sump, means defining a control chamber in said control valve, a spring means in said control chamber normally biasing said valve element for interruption of communication between said source of pressurized fluid and said differential clutch, a relay valve including a valve member for selectively providing communication and interrupting of communication between said source of pressurized fluid and said control chamber, resilient means normally biasing said valve member of said relay valve to a position providing communication between said source of pressurized fluid and said control chamber, means defining a hydraulic actuator defining an actuating chamber in said relay valve adapted for connection to a hydraulic brake system, said hydraulc actuating chamber receiving pressurized fluid to interrupt communication between said source of pressurized fluid and said control chamber against the force of said resilient means when said hydraulic brakes are actuated, said resilient means biasing said valve member of said relay valve for providing communication between said source of pressurized fluid and said control chamber for pressure biasing said control valve element to provide communication between the said source of pressurized fluid and said differential clutch when said brakes are released.

2. A hydraulic valve means as set forth in claim 1 including means in said control chamber limiting the movement of said control element to a position providing communication between said differential clutch and said sump chamber responsive to the biasing force of said spring means.

3. A hydraulic valve means as set forth in claim 1 including stop means limiting the movement of said control valve element against the biasing force of said spring means to place communication between said source of pressurized fluid and said differential clutch.

4. A hydraulic valve means as set forth in claim 1 wherein said hydraulic actuator in said relay valve includes a piston, a chamber in communication with said hydraulic brakes for receiving pressurized fluid from said hydraulic brake system to bias said relay valve to a position providing communication between said control chamber of said control valve with said sump chamber.

5. A hydraulic valve means set forth in claim 1 wherein said valve member defines a piston in said actuating chamber, means adapted for connecting said actuating chamber to the hydraulic braking system to thereby receive pressurized fluid from said braking system for biasing said plunger to a position providing communication between said control chamber and said sump chamber.

6. A hydraulic valve means as set forth in claim 1 wherein said hydraulic actuator in said relay valve includes a piston forming two actuating chambers, means adapted for connecting a first of said actuating chambers to a first circuit of the hydraulic braking system and means connecting the second actuating chamber to a second circuit of the hydraulic braking system.

7. A hydraulic valve means as set forth in claim 1 wherein said valve element of said control valve defines a spool forming lands and grooves for selectively connecting said source of pressurized fluid to said differential clutch responsive to pressurize fluid in said control chamber and selectively connecting said differential clutch to said sump chamber responsive to said spring means for biasing said spool to close said control valve.

8. A hydraulic valve means as set forth in claim 1 including manual control means connected to said valve element of said control valve for selectively positioning said valve element to provide communication between said source of pressurized fluid and said differential clutch and providing communication between said differential clutch and said sump chamber.

9. A hydraulic control means as set forth in claim 1 wherein said spring means normally biases said control element to close said control valve for interrupting communication between said source of pressurized fluid and said differential clutch, manual means for positioning said valve element against the force of said spring means to provide communication between said source of pressurized fluid and said differential clutch.

10. A hydraulic valve means as set forth in claim 1 including manual means connected to said valve element of said control valve for selectively positioning said valve element to initially provide communication between said source of pressurized fluid in said differential clutch.

* * * * *